(12) United States Patent
Soika et al.

(10) Patent No.: US 9,261,206 B2
(45) Date of Patent: Feb. 16, 2016

(54) FLEXIBLE PIPELINE

(71) Applicant: NEXANS, Paris (FR)

(72) Inventors: Rainer Soika, Hannover (DE); Stephan Lange, Wedemark (DE)

(73) Assignee: NEXANS, Paris (FR)

( * ) Notice: Subject to any disclaimer, the term of this patent is extended or adjusted under 35 U.S.C. 154(b) by 0 days.

(21) Appl. No.: 14/537,097

(22) Filed: Nov. 10, 2014

(65) Prior Publication Data

US 2015/0136268 A1    May 21, 2015

(30) Foreign Application Priority Data

Nov. 15, 2013 (EP) .................................... 13306563

(51) Int. Cl.
| | |
|---|---|
| *F16L 9/18* | (2006.01) |
| *F16L 11/15* | (2006.01) |
| *F16L 59/065* | (2006.01) |
| *F16L 59/14* | (2006.01) |
| *F16L 59/153* | (2006.01) |
| *F16L 11/20* | (2006.01) |

(52) U.S. Cl.
CPC .................. *F16L 11/15* (2013.01); *F16L 11/20* (2013.01); *F16L 59/065* (2013.01); *F16L 59/141* (2013.01); *F16L 59/153* (2013.01)

(58) Field of Classification Search
CPC ........ F16L 59/141; F16L 59/065; F16L 11/15
USPC .................. 138/121, 122, 148, 149, 112–114
See application file for complete search history.

(56) References Cited

U.S. PATENT DOCUMENTS

| | | | | |
|---|---|---|---|---|
| 3,595,275 | A * | 7/1971 | Steans et al. ................... | 138/114 |
| 4,121,623 | A * | 10/1978 | Rhone ........................... | 138/114 |
| 4,570,678 | A * | 2/1986 | Ziemek et al. ................ | 138/113 |
| 4,570,679 | A * | 2/1986 | Schippl ......................... | 138/149 |
| 4,984,605 | A * | 1/1991 | Schippl ......................... | 138/149 |
| 6,186,181 | B1 * | 2/2001 | Schippl ......................... | 138/112 |
| 6,607,010 | B1 | 8/2003 | Kashy | |
| 6,732,765 | B2 * | 5/2004 | Schippl et al. ................ | 138/112 |
| 2003/0178080 | A1 * | 9/2003 | Schippl et al. ................ | 138/112 |
| 2010/0229992 | A1 * | 9/2010 | Witz et al. ..................... | 138/109 |

FOREIGN PATENT DOCUMENTS

EP            2253878         11/2010

* cited by examiner

*Primary Examiner* — Patrick F Brinson
(74) *Attorney, Agent, or Firm* — Sofer & Haroun, LLP

(57) ABSTRACT

A flexible pipeline for transporting a pressurized flowable medium, includes two pipes of metal which are corrugated transversely of their longitudinal direction, an inner pipe and an outer pipe which are arranged concentrically relative to each other with the inclusion of an annular gap. A vacuum insulation is arranged in the annular gap between the two pipes. On the other side of the inner pipe is mounted a tension proof reinforcement which is connected at both ends of the inner pipe fixedly to the inner pipe.

2 Claims, 1 Drawing Sheet

FLEXIBLE PIPELINE

RELATED APPLICATION

This application claims the benefit of priority from European Patent Application No. 13 306 563.1, filed on Nov. 15, 2014, the entirety of which is incorporated by reference.

BACKGROUND

1. Field of the Invention

The invention relates to a flexible pipeline for transporting a pressurized flowable medium, which consists of two pipes of metal which are corrugated. transversely of their longitudinal direction, an inner pipe and an outer pipe which are arranged with the inclusion of an annular gap concentrically relative to each other, and in which a vacuum insulation is mounted in the annular gap between the two pipes (EP 2 253 878 B1).

2. Description of the Related Art

Such a pipeline is required, for example, for supplying superconductive magnetic systems or cryo pumps with a cooling medium. The pipeline is supposed to be flexible and should also have a rather long length. For bridging the length, the cooling medium must be transported with an increased pressure in the inner pipe. This is also true for other media, such as water. The increased pressure of the respective medium, for example starting at 25 bar, can easily lead to a plastic deformation of the inner pipe and consequently, may to some extent, lead to a deflection of the same from its central position. The efficacy of the vacuum insulation is permanently reduced by such a plastic deformation.

U.S. Pat. No. 6,607,010 B1 describes a vacuum tight annularly corrugated pipe of synthetic material or metal which, for its stabilization, is lined with a nonwoven fabric which is at both ends thereof attached to the pipe. For protecting the pipe and for its use as a pressurized pipe, it also possible to arrange, on the outside around the pipe, a nonwoven fabric which extends over the entire length of the pipe. This nonwoven fabric is also attached at both ends of the pipe to the same.

The pipeline serving for transporting a deep frozen medium according to the above mentioned EP 2 253 878 B1 does not have the above described deficiency. Over the inner pipe of this known pipeline is arranged a second pipe system which consists of an inner metal pipe, which is corrugated transversely of its longitudinal direction, and an outer metal pipe arranged at a distance and coaxially with the same which is also corrugated transversely of its longitudinal direction. The vacuum insulation and the outer pipe of the pipeline are located above the outer pipe of the second pipe system. The inner pipe of the second pipe system is arranged spatially tight at the inner pipe of the pipeline, and holds the same with the intermediate arrangement of a spacer member of insulating material immovably in its relative position. This known pipeline has been found useful in practice. However, it is of complicated construction.

OBJECTS AND SUMMARY

The invention is based on the object of making the above described pipeline structurally simpler while maintaining a stable relative position in the inner pipe.

This object is met in accordance with the invention in that
  on the outside of the inner pipe a tension proof reinforcement is mounted which is connected at both ends of the inner pipe fixedly with the same, and
  the reinforcement is composed of tension proof strands which are wound in at least two layers helically in opposite directions with one about the other.

This pipeline is very simple and can be manufactured without any additional complicated components. It only has as the additional element the reinforcement of tension proof strands which surround the inner pipe and are tightly connected at the ends thereof and are wound in at least two layers with opposite pitch direction helically one above the other. When the pipeline is assembled, after finishing the inner pipe, the reinforcement is placed on the inner pipe and is mechanically tightly connected with its two axial ends. Otherwise the construction of the pipeline does not have to be changed. An insulation is placed in the conventional manner with spacer members placed on the inner pipe around which the outer pipe is formed. Since the reinforcement is tightly connected to the two ends of the inner pipe, even higher pressures of the medium to be transported cannot have a mechanical effect on the inner pipe. It maintains its length as well as its central location in the outer pipe.

Advantageously, the strands are of high grade steel.

BRIEF DESCRIPTION OF THE DRAWINGS

An embodiment of the subject matter of the invention is illustrated in the drawings.

In the drawing.

DETAILED DESCRIPTION

Figure 1:
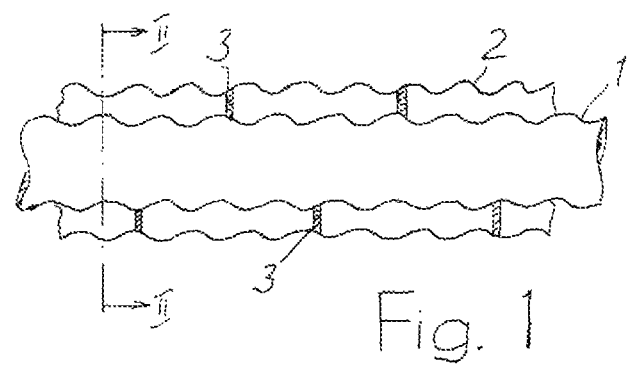
FIG. 1 is a schematic illustration of a pipeline with two pipes corrugated transversely of the longitudinal direction.
Figure 2:
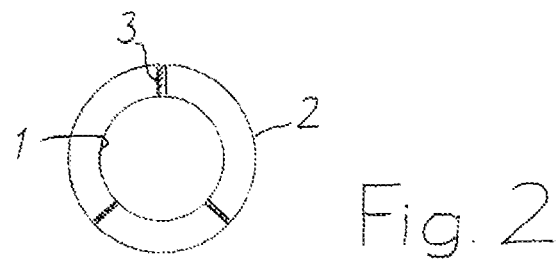
FIG. 2 is a sectional view of FIG. 1 along sectional II-II.

FIG. 1 schematically shows two concentrically arranged pipes 1 and 2 consisting of metal which pipeline serves for transporting a pressurized flowable medium. In accordance with a preferred embodiment, the medium is deep frozen. In the illustrated embodiment, the pipes 1 and 2 are held at a distance from each other by spacer members 3 which are only schematically illustrated. Both pipes 1 and 2 are corrugated transversely of their longitudinal direction, namely helically or annularly. As a result, they have good bending capabilities and, on the other hand, are more stable in the radial direction. Both pipes 1 and 2 are advantageously of high grade steel. In the following, pipe 1 is called the "inner pipe 1," while the pipe 2 is the "outer pipe 2."

Figure 3:
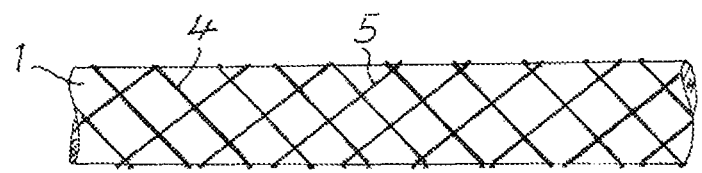
FIG. 3 also schematically shows the inner pipe of a pipeline with reinforcement.
Figure 4:
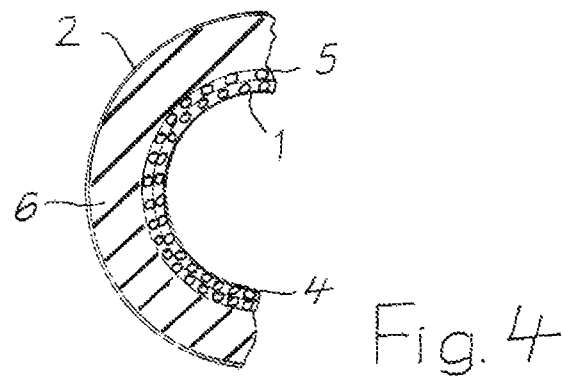
FIG. 4 is a sectional view of a portion of a cross section of a pipeline according to the invention, in an enlarged illustration.

Because of the corrugation, the influence of increased pressure by the medium conducted therethrough can be extended and, thus, can become longer and can be displaced out of its concentric position in the other pipe. In order to eliminate this within narrow limits, a reinforcement is placed around the inner pipe 1 which, in the embodiment of FIG. 3, consists of two tension proof strands 4 and 5. The inner pipe 1 is illustrated in FIG. 3 as a smooth pipe for simplicity and for clarity's sake. The two strands 4 and 5 are wound helically around the inner pipe 1, one on top of the other with opposite pitch directions. They are at both ends of the inner pipe 1 tightly connected to the inner pipe 1, so that the inner pipe 1 cannot expand in the event of increased pressure in its interior.

The two strands 4 and 5 wound with opposite pitch directions onto the inner pipe 1 simultaneously form a torsion protection because of the oppositely directed pitch directions.

In that sense, it could also be possible to apply more than two layers of strands with oppositely directed pitch directions on the inner pipe 1.

The strands 4 and 5 advantageously are of high grade steel. However, other tension proof materials are also conceivable. They can be constructed as bands. In accordance with a preferred embodiment, the strands 4 and 5 can be constructed as ropes 4 and 5 which, in accordance with known technology, can be manufactured with a relatively small diameter. For manufacturing the pipeline according to the invention, the following procedure is carried out:

Initially, the two tension proof strands 4 and 5 are wound around the prefabricated inner pipe 1 and can be connected to the inner pipe 1 at both ends thereof. Subsequently, if applicable, the spacer member 3 and a material serving as thermal insulation are applied to the inner pipe 1 or to the two layers with the tension proof strands 4 and 5. The outer pipe 2 is then formed around the thermal insulation 6 and the spacer member 3. Finally, the annular gap between the inner pipe 1 and the outer pipe 2 is evacuated, so that a vacuum insulation is present between the two pipes which protects the interior of the pipeline against an introduction of heat from the outside.

The invention claimed is:

1. Flexible pipeline for transporting a pressurized flowable medium, comprising:
    two metal pipes which are corrugated transversely of their longitudinal direction, said metal pipes including an inner pipe and an outer pipe which are arranged at a distance concentrically and relative to each other so as to form an annular gap,
    wherein a vacuum insulation is mounted in the annular gap between the two pipes,
    wherein that on the outside of the inner pipe a tension proof reinforcement is fixedly mounted at both ends of the inner pipe, and
    wherein said reinforcement has two tension proof strands which are wound helically in at least two layers with different pitch directions one above the other around the inner pipe.

2. Pipeline according to claim 1, wherein the strands are of high grade steel.

* * * * *